(12) United States Patent
Lee et al.

(10) Patent No.: US 12,257,875 B2
(45) Date of Patent: Mar. 25, 2025

(54) VOID BUSHING FOR A VEHICLE SUSPENSION

(71) Applicants: HYUNDAI MOTOR COMPANY, Seoul (KR); KIA CORPORATION, Seoul (KR)

(72) Inventors: Hae Seong Lee, Yongin-si (KR); Jae Hyun Cho, Incheon (KR); Sang Hoon Yoo, Asan-si (KR); Dae Won Jang, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 402 days.

(21) Appl. No.: 17/873,901

(22) Filed: Jul. 26, 2022

(65) Prior Publication Data
US 2023/0124438 A1    Apr. 20, 2023

(30) Foreign Application Priority Data
Oct. 14, 2021    (KR) .................. 10-2021-0136839

(51) Int. Cl.
*B60G 7/00* (2006.01)
*B60G 3/20* (2006.01)
*B60G 7/04* (2006.01)

(52) U.S. Cl.
CPC ............ *B60G 7/008* (2013.01); *B60G 3/20* (2013.01); *B60G 7/04* (2013.01); *B60G 2204/41* (2013.01)

(58) Field of Classification Search
None
See application file for complete search history.

(56) References Cited

U.S. PATENT DOCUMENTS

| 10,718,395 B2 | 7/2020 | Krehmer et al. |
| 2012/0292872 A1* | 11/2012 | Koide .................. B60G 7/001 280/124.108 |
| 2014/0367546 A1* | 12/2014 | Hibi .................... F16F 1/3835 248/635 |

(Continued)

FOREIGN PATENT DOCUMENTS

| JP | 2006090409 A | 4/2006 |
| JP | 2008163986 A | 7/2008 |

(Continued)

OTHER PUBLICATIONS

JP-2020051466-A—English Machine Translation (Year: 2020).*

(Continued)

*Primary Examiner* — Melanie Torres Williams
(74) *Attorney, Agent, or Firm* — Lempia Summerfield Katz LLC (57) ABSTRACT

A void bushing for a vehicle suspension is configured to have protrusion parts formed to protrude outwards on a bulge part of an inner pipe. The protrusion parts are located to be disposed in oblique line directions between void portions of an elastic body that is filled between the inner pipe and an outer pipe. In the void bushing, ride comfort characteristics and durability characteristics of a vehicle may be maintained, as they are, under favorable conditions by the void portions. Further the handling response characteristics of the vehicle may be advantageously improved by promoting a rigidity increase through the protrusion parts.

8 Claims, 6 Drawing Sheets

(56) References Cited

U.S. PATENT DOCUMENTS

2020/0207170 A1    7/2020    Hosoda

FOREIGN PATENT DOCUMENTS

| | | | |
|---|---|---|---|
| JP | 2015175400 A | * | 10/2015 |
| JP | 6040031 B2 | * | 12/2016 |
| JP | 2018091463 A | | 6/2018 |
| JP | 2020051466 A | * | 4/2020 |
| KR | 100227384 B1 | | 11/1999 |
| KR | 20070032134 A | | 3/2007 |
| KR | 2011139609 A | * | 12/2011 |

OTHER PUBLICATIONS

JP-6040031-B2—English Machine Translation (Year: 2016).*
JP-2015175400-A—English Machine Translation (Year: 2015).*
KR-2011139609-A—English Machine Translation (Year: 2011).*

* cited by examiner

VOID BUSHING FOR A VEHICLE SUSPENSION

CROSS-REFERENCE TO RELATED APPLICATION

The present application claims priority to Korean Patent Application No. 10-2021-0136839, filed Oct. 14, 2021, the entire contents of which are incorporated herein for all purposes by this reference.

BACKGROUND

Field of the Disclosure

The present disclosure relates to a void bushing for a vehicle suspension and, more particularly, to a technology for a void bushing for a vehicle suspension capable of satisfying riding comfort characteristics, durability characteristics, and handling response characteristics.

Description of the Related Art

A vehicle suspension is a device that prevents damage to a vehicle body or load. The vehicle suspension improves riding comfort by preventing vibrations or shocks received from a road surface from being transmitted directly to the vehicle body when driving. The vehicle suspension does so by connecting a vehicle axle and the vehicle body to each other.

In a front wheel MacPherson type suspension, an L-shaped lower arm configured to respectively connect the vehicle body and a vehicle wheel thereto to support the same is used. Bushings respectively coupled to the vehicle body and a ball joint coupled to the vehicle wheel are coupled to three ends of the lower arm.

Among the bushings coupled to the lower arm, the bushing coupled in a vertical direction is called a geometry bushing (G bushing). In the case of a front-wheel-drive high-performance vehicle using a MacPherson system, the G-Bushing has a substantial effect impacting the handling characteristics of the vehicle.

In general, the G bushing used in the lower arm of the suspension is a solid type bushing in which all spaces between an inner pipe and an outer pipe are filled with rubber, i.e. an elastic body. Here, the solid type bushing has good (e.g., desired) handling response characteristics and is suitable for a high-performance vehicle but, on the contrary, has a drawback in terms of unfavorable ride comfort characteristics and durability characteristics.

The foregoing is intended merely to aid in understanding the background of the present disclosure. The foregoing is not to be understood that the present disclosure or the foregoing falls within the purview of the related art that is already known to those having ordinary skill in the art.

SUMMARY

Accordingly, the present disclosure has been made keeping in mind the above problems occurring in the related art. The present disclosure is for a void bushing for a vehicle suspension in which void portions are formed in an elastic body filled between an inner pipe and an outer pipe. Protrusion parts are formed to protrude outwards on a bulge part of the inner pipe and are located in oblique line directions between the void portions. Furthermore, void bushing of the present disclosure is intended to satisfy performance of ride comfort characteristics, durability characteristics, and handling characteristics through this construction.

In order to achieve the above objects, according to one aspect of the present disclosure, a void bushing for a vehicle suspension is provided. The void bushing includes: an inner pipe provided with a bulge part; an outer pipe surrounding the inner pipe; and an elastic body coupled to and filled in a space between the inner pipe and the outer pipe. The elastic body is formed with void portions therein. The bulge part is formed with protrusion parts protruding outwards thereon and the protrusion parts are located in oblique line directions between the void portions.

The void portions may be symmetrically located with a center of the inner pipe as a reference.

The protrusion parts may be symmetrically formed to protrude with the center of the inner pipe as a reference.

The void portions may be symmetrically located with the center of the inner pipe as a reference and the protrusion parts may be symmetrically formed to protrude with the center of the inner pipe as a reference. The protrusion parts may be located in the oblique line directions between the void portions.

For a first reference line and a second reference line passing in left-right directions and front-rear directions through the center of the inner pipe, respectively, the void portions may comprise two void portions. The two void portions may be symmetrically formed in left-right directions with the second reference line as a center. Each of the two void portions may be symmetrically formed in up-down directions, with the first reference line as a center. Further the protrusion parts may comprise two protrusion parts. The two protrusion parts may be symmetrically formed to protrude with the center of the inner pipe as a reference. Each of the protrusion parts may be located in oblique line directions between the first reference line and the second reference line.

When a lower end of the second reference line is defined as 0°, one protrusion part may be located at 110° to 145° counterclockwise and a remaining protrusion part may be located at 290° to 325° counterclockwise.

A span between the two void portions in the elastic body may become two bridge parts. The two bridge parts may be symmetrically located in up-down directions with the first reference line as a center. Further, each of the two bridge parts may be symmetrically formed in left-right directions with the second reference line as a center.

When the outer pipe is fixedly coupled to an L-shaped lower arm, the two void portions may be respectively located in any one direction among left-right directions, upper left-lower right oblique line directions, and lower left-upper right oblique directions.

As described above, a void bushing for a vehicle suspension according to the present disclosure is configured to have void portions formed in an elastic body filled between an inner pipe and an outer pipe. The void bushing is also configured to have protrusion parts formed to protrude outwards on a bulge part of the inner pipe and disposed in oblique line directions between the void portions. Accordingly, there is an effect (e.g., advantage) in that the void bushing can maintain ride comfort characteristics and durability characteristics of the vehicle, as they are, under favorable conditions due to the void portions disposed in left-right directions. Further, the void bushing can advantageously improve handling response characteristics of the vehicle by promoting a rigidity increase through the protrusion parts disposed in the oblique line directions between the void portions.

BRIEF DESCRIPTION OF THE DRAWINGS

The above and other objects, features, and other advantages of the present disclosure should be more clearly understood from the following detailed description when taken in conjunction with the accompanying drawings, in which.

DETAILED DESCRIPTION

Specific structural or functional descriptions of embodiments of the inventive concept disclosed in the present specification or application are only exemplified for the purpose of describing the embodiments according to the present disclosure. The embodiments according to the present disclosure may be implemented in various forms and should not be construed as being limited to the embodiments described in the present specification or application.

The embodiments, according to the present disclosure, may be applied with various changes and have various forms, though specific embodiments are illustrated in the drawings and described in detail in the present specification or application. However, this is not intended to limit the embodiments according to the concepts of the present disclosure to a specific disclosed form and should be understood to include all modifications, equivalents, and substitutes included in the spirit and scope of the present disclosure.

Terms such as first, second, and the like may be used to describe various elements, but the elements should not be limited by the terms. The above terms are used only for the purpose of distinguishing one element from another. For example, while without departing from the scope of the present disclosure, a first element may be called a second element, and similarly, the second element may also be referred to as the first element.

When an element is referred to as being "coupled" or "connected" to another element, the element may be directly coupled or connected to the other element, but it should be understood that other elements may exist in between. On the other hand, when it is mentioned that a certain element is "directly coupled" or "directly connected" to another element, it should be understood that no other element is present in between. Other expressions describing the relationship between elements, such as "between" and "immediately between," "neighboring to," and "directly adjacent to," or the like, should be interpreted similarly.

The terms used in the present specification are used only to describe specific embodiments and are not intended to limit the present disclosure. A singular expression includes a plural expression unless a context clearly dictates otherwise. In the present specification, terms such as "comprise" or "have" are intended to designate that an implemented feature, number, step, operation, element, part, or a combination thereof exists, but it should be understood that it does not preclude the existence or addition of one or more features, numbers, steps, operations, elements, parts, or combinations thereof.

Unless defined otherwise, all terms used herein, including technical and scientific terms, have the same meaning as commonly understood by one having ordinary skill in the art to which the present disclosure belongs. Terms such as those defined in commonly used dictionaries should be interpreted as having meanings consistent with the context of the related art and, unless explicitly defined in the present specification, should not be interpreted in an ideal or excessively formal meaning.

A control unit (controller) according to an embodiment of the present disclosure may be implemented through a processor (not shown). The processor may be configured to perform operations described below using an algorithm configured to control the operation of various elements of a vehicle or data stored in a non-volatile memory (not shown), and a corresponding memory. The non-volatile memory and the corresponding memory may be configured to store data regarding a software instruction configured to reproduce the algorithm. Here, the memory and the processor may be implemented as individual chips. Alternatively, the memory and processor may be implemented as an integrated single chip. A processor may take a form of one or more processors.

Hereinafter, a void bushing for a vehicle suspension according to an embodiment of the present disclosure is described with reference to the accompanying drawings.

Figure 1:
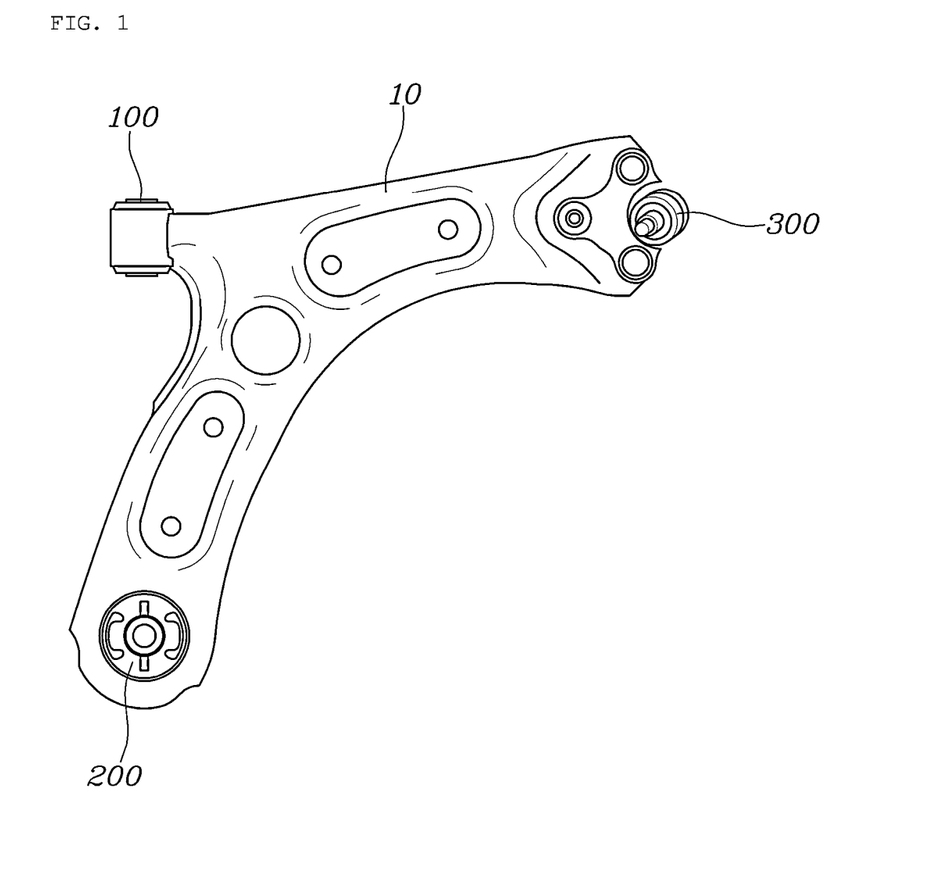
FIG. 1 is a view showing a lower arm with which a void bushing is combined according to the present disclosure.

As shown in FIG. 1, an L-shaped lower arm 10 is configured to connect to a vehicle body and to a vehicle wheel and to support same. The lower arm 10 is coupled to a front wheel MacPherson type suspension.

The L-shaped lower arm 10 is provided with three ends. A bushing is coupled in a horizontal direction, a void bushing is coupled in a vertical direction, and a ball joint is coupled, to the three ends, respectively.

Bushings 100 and 200 are coupled to a suspension member (subframe) of the vehicle and the ball joint 300 is coupled to the vehicle wheel.

The bushing 100 coupled in the horizontal direction is also called an A bushing. The void bushing 200 coupled in the vertical direction is also called a geometry bushing (G bushing). In the case of a high-performance front-wheel-drive vehicle using a MacPherson system, the G bushing has a large or substantial effect impacting the handling characteristics of the vehicle.

Figure 2:
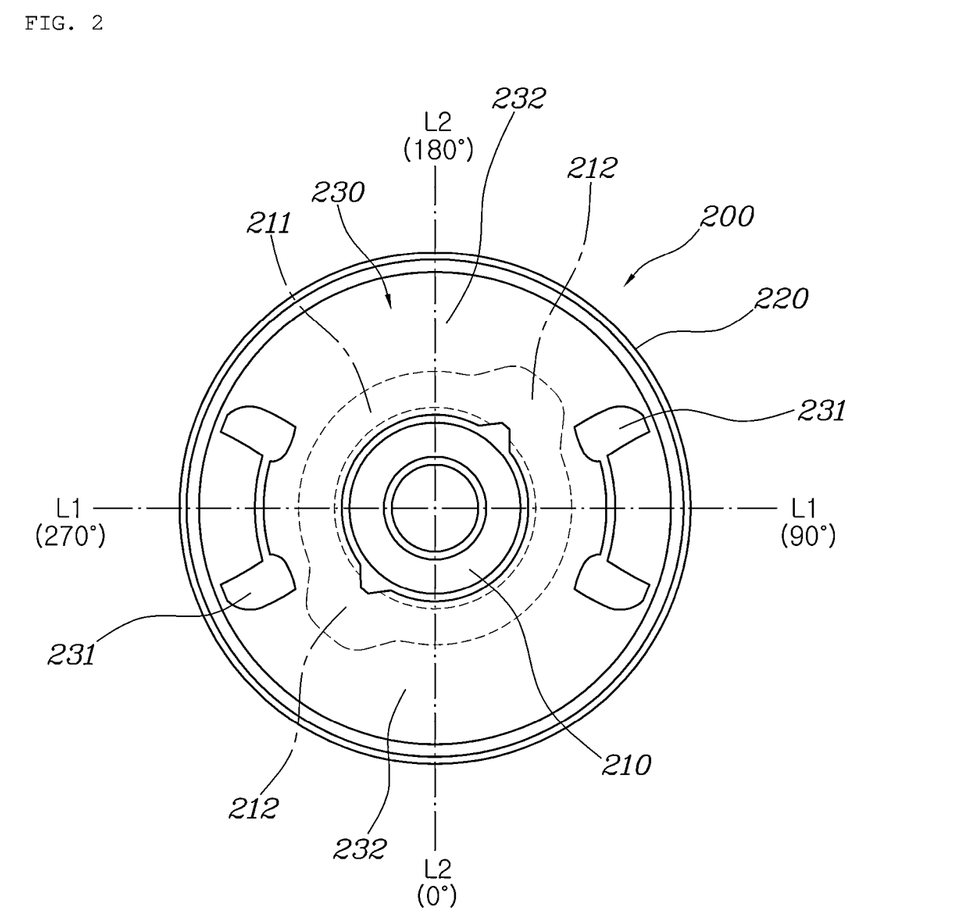
FIG. 2 is a plan view showing the void bushing according to the present disclosure.
Figure 3:
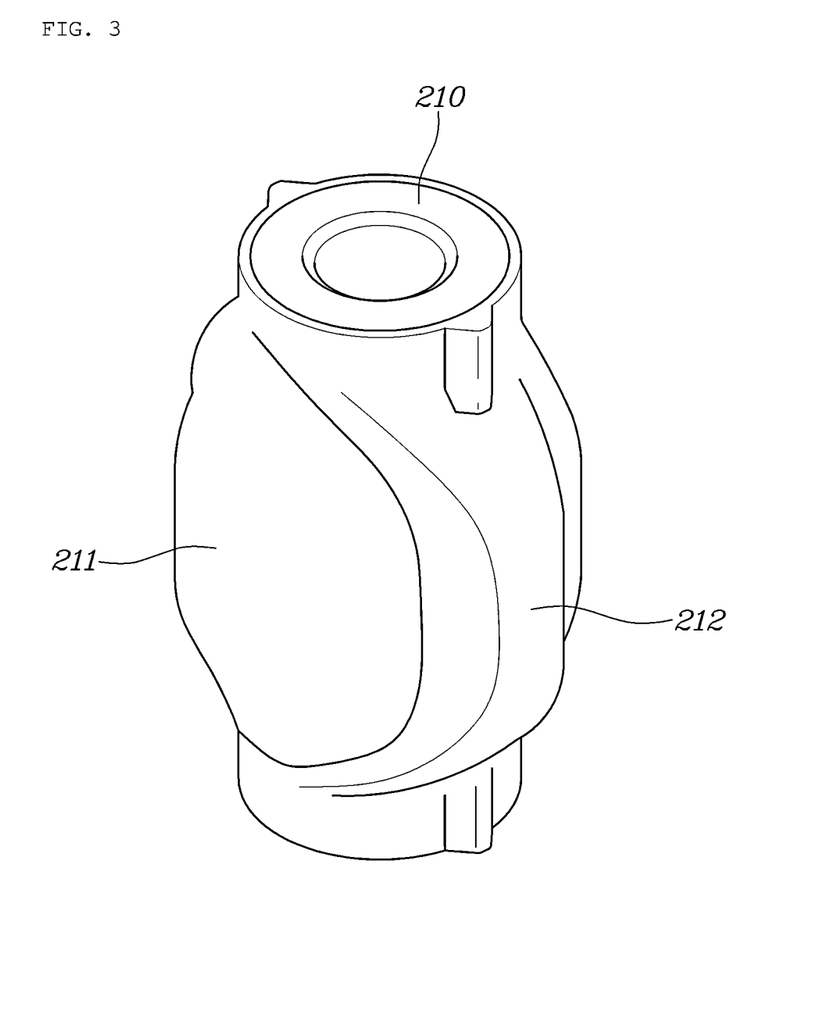
FIG. 3 is a perspective view showing an inner pipe of a void bushing and having a bulge part formed with protrusion parts according to the present disclosure.
Figure 4:
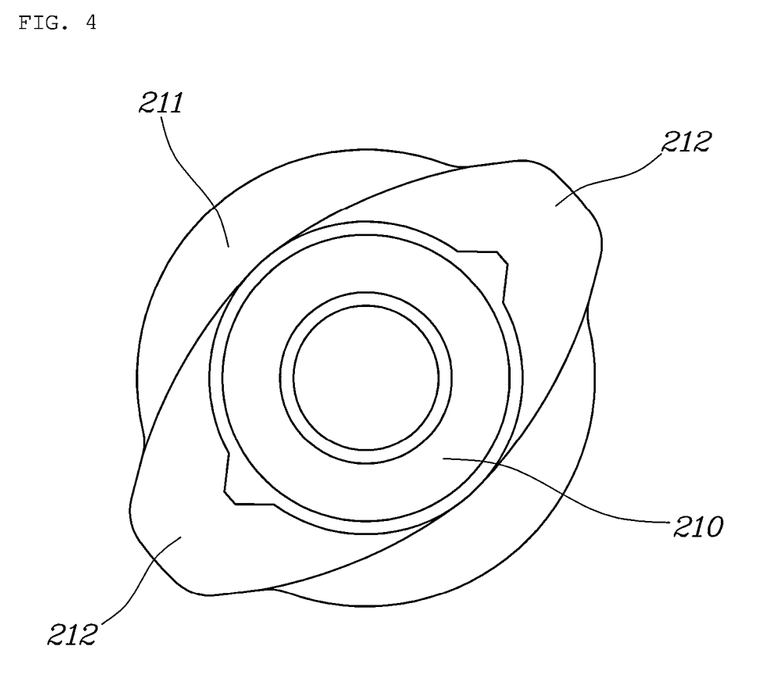
FIG. 4 is a plan view of FIG. 3.

As shown in FIGS. 2-4, the void bushing 200, according to the present disclosure, includes: an inner pipe 210 provided with a bulge part 211; an outer pipe 220 surrounding the inner pipe 210; and an elastic body 230 coupled to and filled in a space between the inner pipe 210 and the outer pipe 220. The elastic body 230 is formed with void portions 231 therein.

The inner pipe 210 and the outer pipe 220 are formed in a cylindrical pipe shape and the elastic body 230 is formed with rubber material.

The bulge part 211 is a portion that surrounds an outer circumferential of the inner pipe 210 and is formed convex outwards.

Void portions 231 each become an empty space formed in the elastic body 230 and are formed to penetrate through an upper surface and a lower surface of the elastic body 230.

A span between the void portions 231 in the elastic body 230 becomes or includes bridge parts 232 connecting the inner pipe 210 and the outer pipe 220.

The void portions 231 more effectively (e.g., efficiently) absorb and attenuate input shock and vibration, thereby serving to improve riding comfort characteristics and durability characteristics.

The bridge parts 232 improve the rigidity of the void bushing through a connection of the inner pipe 210 and the outer pipe 220, thereby serving to advantageously improve handling response characteristics.

According to an embodiment of the present disclosure, the void portions 231 are composed of two portions and are formed to be symmetrically located with a center of the inner pipe 210 as a reference.

In other words, as shown in FIG. 2, a first reference line L1 and a second reference line L2 pass in left-right directions and front-rear directions through the center of the inner pipe 210, respectively. The two void portions 231 are symmetrically formed in left-right directions with the second reference line L2 as a center. Each of the two void portions 231 is symmetrically formed in up-down directions with the first reference line L1 as a center.

When a lower end of the second reference line L2 is defined as 0°, one void portion 231 is located at 90°, and a remaining void portion 231 is located at 270°, counterclockwise. In addition, two bridge parts 232 are disposed in a perpendicular direction to the two void portions 231 and are located at 0° and 180°, respectively.

In other words, the two void portions 231 are disposed in the left-right directions and the two bridge parts 232 are disposed in the front-rear directions. As such, the ride comfort characteristics and durability characteristics of the vehicle are improved, by the two void portions 231 disposed in the left-right directions. On the contrary, as the two bridge parts 232 are disposed in the front-rear directions, the handling response characteristics of the vehicle become relatively disadvantageous.

In order to improve the handling response characteristics of the vehicle, the two bridge parts 232 may have, counterclockwise based on 0° i.e., the lower end of the second reference line L2, one bridge part 232 located at 115° to 130° and a remaining bridge part 232 located at 295° to 310°. However, as described above, as the two bridge parts 232 are located at 0° and 180°, respectively, the handling response characteristics are disadvantageous compared to the ride comfort characteristics and durability characteristics.

In order to improve the disadvantageous handling response characteristics, the void bushing 200, according to the present disclosure, is formed with protrusion parts 212 that protrude outwards on the bulge part 211 of the inner pipe 210. The handling response characteristics of the vehicle are thereby improved through the disposition of the protrusion parts 212.

According to the present disclosure, the protrusion parts 212 formed on the bulge part 211 of the inner pipe 210 are symmetrically formed to protrude with the center of the inner pipe 210 as a reference. The protrusion parts 212 are configured to be located in oblique line directions between the two void portions 231.

In other words, the two protrusion parts 212 are symmetrically formed to protrude with the center of the inner pipe 210 as a reference. Each of the protrusion parts 212 is configured to be located in the oblique line directions between the first reference line L1 and the second reference line L2.

More specifically, when the lower end of the second reference line L2 is defined as 0°, the one protrusion part 212 is located at 110° to 145° counterclockwise, and a remaining protrusion part 212 is located at 290° to 325° counterclockwise.

When the two protrusion parts 212 are disposed at the same angle as above, the two protrusion parts 212 may, instead of the bridge parts 232, satisfy the conditions that the one bridge part 232 is located at 115° to 130° and the remaining bridge part 232 is located at 295° to 310°. Through this, it is possible to advantageously improve the handling response characteristics of the vehicle.

In other words, in the void bushing 200, according to the present disclosure, there are advantages in that the ride comfort characteristics and durability characteristics of the vehicle may be maintained, as they are, i.e., at their current performance level, under favorable conditions by the two void portions 231 disposed in the left-right directions. Further, the handling response characteristics of the vehicle may be advantageously improved by promoting a rigidity increase through the two protrusion parts 212 disposed in the oblique line directions between the two void portions 231.

In the embodiment, according to the present disclosure, when a protrusion length of the protrusion parts 212 is increased, the characteristics (e.g., ride comfort characteristics and durability characteristics) by the void portions 231, the characteristics (e.g., handling response characteristics) by the bridge parts 232, and the characteristics (e.g., handling response characteristics) by the protrusion parts 212, increase together. Such an increase in the characteristics by the protrusion parts 212 becomes greater than an increase in the characteristics by the void portions 231 and the bridge parts 232.

Figure 5:
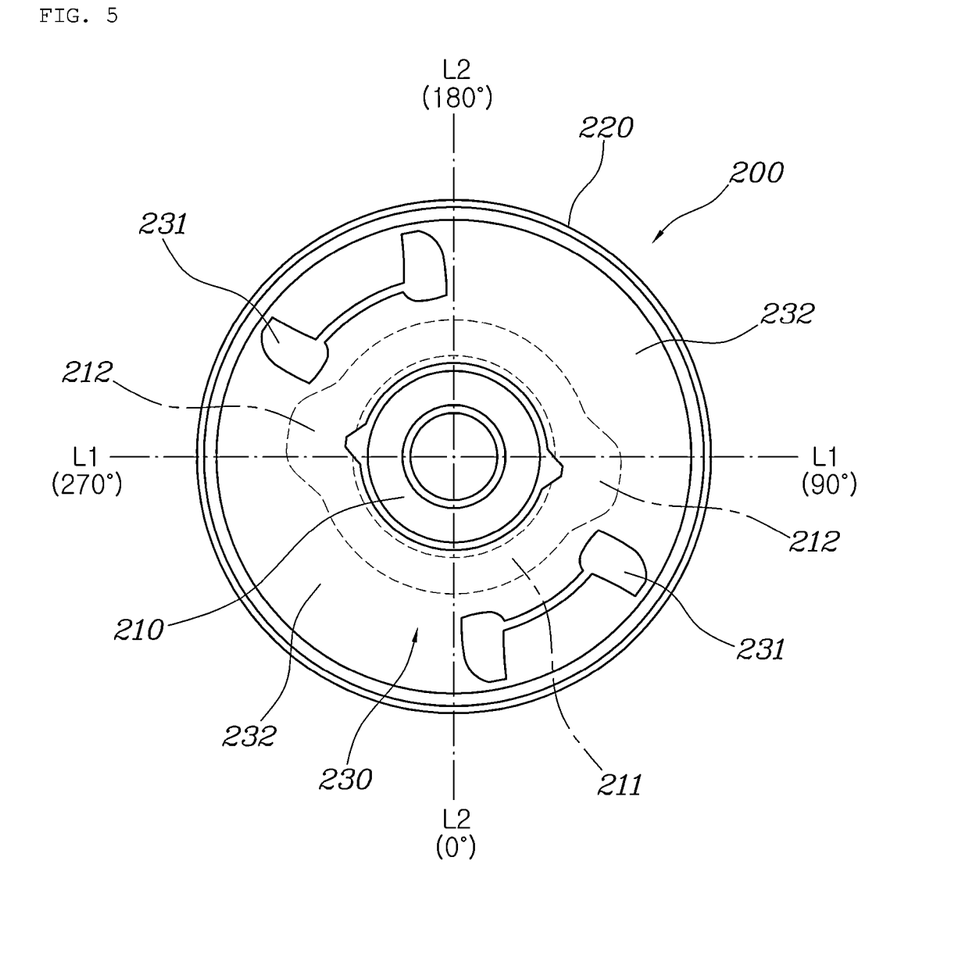
FIGS. 5 and 6 are views showing an example when the void bushing, according to the present disclosure, is coupled to the lower arm.
Figure 6:
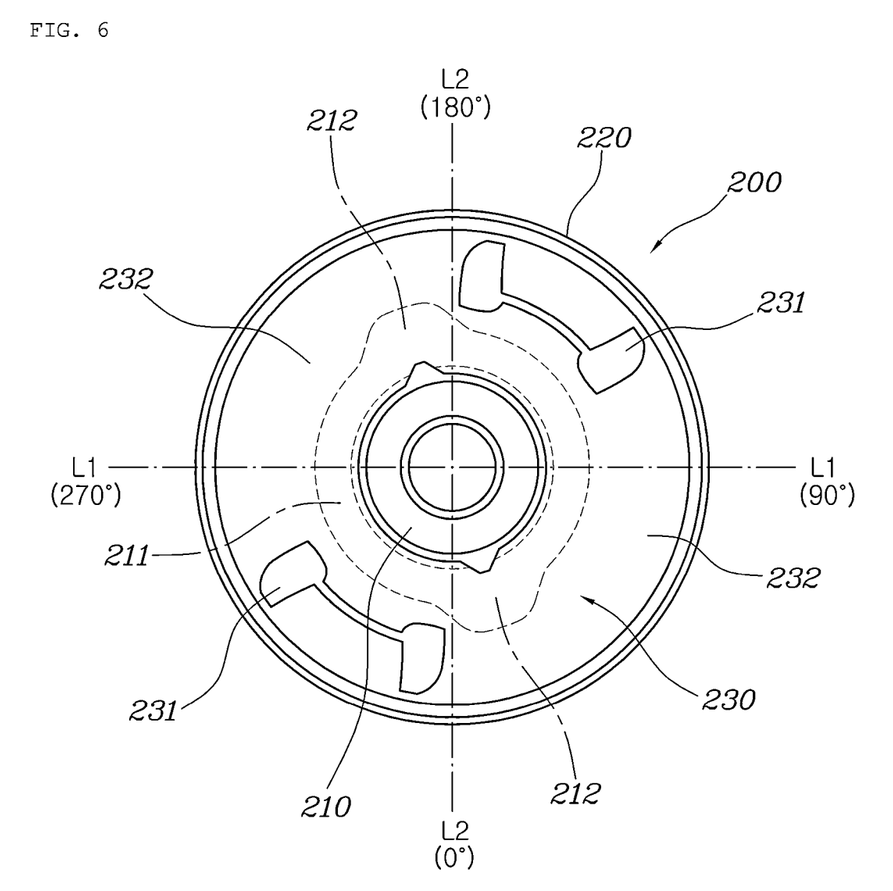

In addition, when the void bushing 200, according to the embodiment of the present disclosure, is fixedly coupled to the lower arm 10, the two void portions 231 may be respectively located in left-right directions as shown in FIG. 2, located in upper left-lower right oblique line directions as shown in FIG. 5, or located in lower left-upper right oblique directions as shown in FIG. 6. Accordingly, handling performance may be promoted to increase under more favorable conditions by varying steering change, camber change, and stiffness change of the vehicle according to each disposition structure.

As described above, the void bushing for a vehicle suspension, according to the present disclosure, is configured to have the void portions 231 formed in the elastic body 230, which is filled between the inner pipe 210 and the outer pipe 220, and the protrusion parts 212 formed on the bulge part 211 to protrude outwards. The protrusion parts 212 are disposed in the oblique line directions between the two void portions 231. Accordingly, there are advantages for the void bushing for a vehicle suspension in that the ride comfort characteristics and durability characteristics of the vehicle may be maintained, as they are, under favorable conditions by the two void portions 231 disposed in the left-right directions. Further the handling response characteristics of the vehicle may be advantageously improved by promoting the rigidity increase through the two protrusion parts 212 disposed in the oblique line directions between the two void portions 231.

In the case of a front-wheel-drive high-performance vehicle using the MacPherson system, the void bushing 200 and the G bushing coupled to the lower arm 10 have a large effect on the handling characteristics of the vehicle.

As a result of an evaluation, increasing the characteristics of the void bushing 200 in a direction sensitive to handling serves to improve the handling characteristics of the vehicle.

Therefore, the void bushing 200, according to the embodiment of the present disclosure, allows the void portions 231 to be disposed in the left-right directions as in the related art, whereby the ride comfort characteristics and durability characteristics of the vehicle are maintained, as they are, under favorable conditions. Further allowing the protrusion parts 212 to be disposed in the direction sensitive to the handling characteristics, whereby the handling response characteristics of the vehicle may be advantageously improved.

In other words, through the void bushing 200, according to the present disclosure, it is possible to minimize a loss of the ride comfort characteristics and durability characteristics arising from improving the handling performance of the vehicle.

Although the present disclosure has been shown and described with reference to specific embodiments, it should be apparent to those having ordinary skill in the art that the present disclosure may be variously improved and changed without departing from the spirit of the present disclosure provided by the following claims.

What is claimed is:

1. A void bushing for a vehicle suspension, the void bushing comprising:
   an inner pipe provided with a bulge part;
   an outer pipe surrounding the inner pipe; and
   an elastic body coupled to and filled in a space between the inner pipe and the outer pipe and formed with void portions therein,
   wherein the bulge part is formed with protrusion parts protruding outwards thereon,
   wherein the protrusion parts are located in oblique line directions between the void portions,
   wherein, for a first reference line and a second reference line passing in left-right directions and front-rear directions through the center of the inner pipe, respectively, the void portions comprise two void portions and the two void portions are symmetrically formed in the left-right directions with the second reference line as a center, and
   wherein each of the two void portions is symmetrically formed in up-down directions with the first reference line as a center.

2. The void bushing of claim 1, wherein the void portions are symmetrically located with a center of the inner pipe as a reference.

3. The void bushing of claim 1, wherein the protrusion parts are symmetrically formed to protrude with the center of the inner pipe as a reference.

4. The void bushing of claim 1, wherein:
   the void portions are symmetrically located with the center of the inner pipe as a reference; and
   the protrusion parts are symmetrically formed to protrude with the center of the inner pipe as a reference and are located in the oblique line directions between the void portions.

5. The void bushing of claim 1,
   wherein the protrusion parts comprise two protrusion parts and the two protrusion parts are symmetrically formed to protrude with the center of the inner pipe as a reference, and wherein each of the protrusion parts is located in oblique line directions between the first reference line and the second reference line.

6. The void bushing of claim 5, wherein, when a lower end of the second reference line is defined as 0°, one protrusion part is located at 110° to 145° counterclockwise, and a remaining protrusion part is located at 290° to 325° counterclockwise.

7. The void bushing of claim 5, wherein:
   a span between the two void portions in the elastic body includes two bridge parts; and
   the two bridge parts are symmetrically located in up-down directions with the first reference line as a center, and each of the two bridge parts is symmetrically formed in left-right directions with the second reference line as a center.

8. The void bushing of claim 7, wherein, when the outer pipe is fixedly coupled to a lower arm of a suspension, the two void portions are respectively located in any one direction among left-right directions, upper left-lower right oblique line directions, and lower left-upper right oblique directions.

* * * * *